(12) United States Patent
Dörner et al.

(10) Patent No.: US 8,790,064 B2
(45) Date of Patent: Jul. 29, 2014

(54) DEVICE AND METHOD FOR ALIGNING THE POSITION OF PLATE-SHAPED PARTS

(75) Inventors: Reiner Dörner, Eppingen (DE); Joachim Pottiez, Sulzfeld (DE)

(73) Assignee: Schuler Automation GmbH & Co. KG., Hessdorf (DE)

(*) Notice: Subject to any disclaimer, the term of this patent is extended or adjusted under 35 U.S.C. 154(b) by 313 days.

(21) Appl. No.: 12/739,919

(22) PCT Filed: Mar. 12, 2008

(86) PCT No.: PCT/EP2008/001944
§ 371 (c)(1),
(2), (4) Date: Apr. 26, 2010

(87) PCT Pub. No.: WO2009/112051
PCT Pub. Date: Sep. 17, 2009

(65) Prior Publication Data
US 2010/0232923 A1    Sep. 16, 2010

(51) Int. Cl.
| | |
|---|---|
| G01B 11/06 | (2006.01) |
| B65H 9/10 | (2006.01) |
| C21D 9/00 | (2006.01) |
| G01B 11/02 | (2006.01) |
| G01B 11/26 | (2006.01) |
| B25J 9/00 | (2006.01) |
| B21D 43/10 | (2006.01) |
| B21D 43/00 | (2006.01) |
| B21D 43/11 | (2006.01) |
| B23Q 7/18 | (2006.01) |
| B25J 9/16 | (2006.01) |

(52) U.S. Cl.
CPC .............. *B21D 43/11* (2013.01); *B25J 9/0093* (2013.01); *B21D 43/105* (2013.01); *B21D 43/003* (2013.01); *B25J 9/0084* (2013.01); *B23Q 2240/002* (2013.01); *B23Q 7/18* (2013.01); *B25J 9/1697* (2013.01); *Y10S 901/07* (2013.01)
USPC ............. 414/783; 700/114; 901/7; 198/345.1

(58) Field of Classification Search
USPC .............. 198/345.1, 376, 395, 401, 437, 444, 198/456; 271/226–228; 414/222.05, 414/222.06, 749.6, 775, 781, 783, 793, 797, 414/797.1; 700/262, 263, 114; 901/46–47, 901/7, 9; 72/420, 422
See application file for complete search history.

(56) References Cited

U.S. PATENT DOCUMENTS

| | | | | |
|---|---|---|---|---|
| 4,105,925 | A * | 8/1978 | Rossol et al. ............ | 250/559.37 |
| 4,228,886 | A * | 10/1980 | Moran .......................... | 198/395 |
| 4,435,837 | A * | 3/1984 | Abernathy .................... | 382/111 |
| 5,040,056 | A * | 8/1991 | Sager et al. .................... | 348/88 |

(Continued)

FOREIGN PATENT DOCUMENTS

| | | | | |
|---|---|---|---|---|
| DE | 19809184 | A1 | 10/1998 | |
| DE | 19856151 | A1 * | 4/2000 | ............ B65G 59/02 |

(Continued)

OTHER PUBLICATIONS

Schuler, Optische Zentrierstation fur Platinen in Blech Rohre Profile Jun. 1999.

(Continued)

*Primary Examiner* — Gregory Adams
(74) *Attorney, Agent, or Firm* — Browdy and Neimark, PLLC

(57) ABSTRACT

A device is proposed for the positional orientation of plate-shaped parts (12), comprising continuous conveying equipment (13) for conveying plate-shaped parts (12), an optical measuring device (15) assigned to the continuous conveying equipment (13) for determining the actual position of at least one specific plate-shaped part (12) and for comparing this actual position to a stored set position and for determining the deviation of the actual position from the set position, and a control unit (20) coupled to the optical measuring device (15) for controlling a positioning unit (19) such that at least one specific plate-shaped part (12) the deviation of which from the set position was determined can be picked up by the positioning unit (19) in a pick-up region and deposited in a defined delivery region in the correct position corresponding to the set position for transfer on the continuous conveying equipment (13).

15 Claims, 3 Drawing Sheets

(56) References Cited

U.S. PATENT DOCUMENTS

Figure 1:
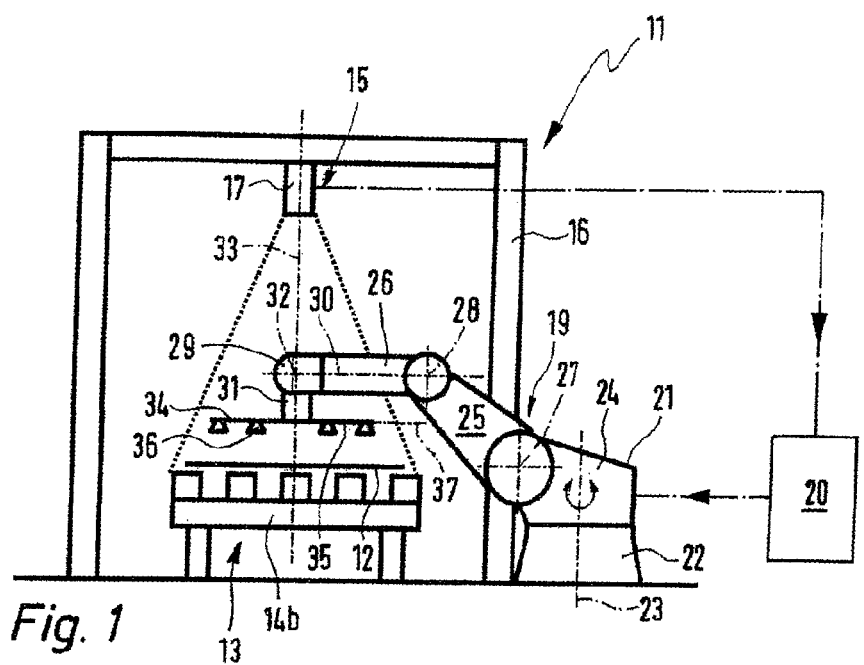

| | | | |
|---|---|---|---|
| 5,910,894 A * | 6/1999 | Pryor | 700/95 |
| 5,950,484 A * | 9/1999 | Kutschker | 72/420 |
| 6,360,142 B1 | 3/2002 | Miura et al. | |
| 6,644,080 B2 * | 11/2003 | Lindstrom | 72/19.4 |
| 6,817,829 B2 * | 11/2004 | Kameda et al. | 414/789.6 |
| 6,876,897 B2 * | 4/2005 | Gillen et al. | 700/114 |
| 7,201,032 B2 | 4/2007 | Pfitzner | |
| 7,266,422 B1 * | 9/2007 | DeMotte et al. | 700/217 |
| 2004/0240981 A1 * | 12/2004 | Dothan et al. | 414/795.4 |
| 2006/0099064 A1 * | 5/2006 | Anaki et al. | 414/797 |
| 2007/0180886 A1 * | 8/2007 | Kutschker | 72/422 |

FOREIGN PATENT DOCUMENTS

| | | | |
|---|---|---|---|
| DE | 10059312 A1 | 6/2002 | |
| DE | 69903777 T2 | 7/2003 | |
| DE | 102004051977 A1 | 4/2006 | |
| DE | 102004051994 A1 | 4/2006 | |
| EP | 1352856 A1 | 10/2003 | |
| EP | 1570927 A1 | 9/2005 | |
| JP | 2003312901 A * | 11/2003 | B65H 9/00 |
| WO | 2004/076319 A1 | 9/2004 | |
| WO | 2006/128393 A1 | 12/2006 | |

OTHER PUBLICATIONS

ABB "Automatisieren einer Pressenlinie bei Thyssen Krupp Umformtechnik" (2006).

Strothmann, Feeder oder Roboter? in Bander, Bleche, Rohre Oktober (2001).

* cited by examiner

DEVICE AND METHOD FOR ALIGNING THE POSITION OF PLATE-SHAPED PARTS

The invention relates to a device for aligning the position of plate-shaped parts, in particular sheet metal blanks.

In so-called press lines, a high throughput can only be achieved if sheet metal blanks supplied by means of continuous conveying equipment are transferred to a station, in particular a downstream metal-forming press, in the correct position, i.e. in a defined set position. In this context, a known method provides for the determination of the actual position of arriving sheet metal blanks by means of an optical measuring device and for comparing this to a stored set position. From the comparison between actual and set values, a deviation from the set position is determined, which is corrected by providing that a handling unit, for example a robot, picks up the sheet metal blank deviating from the set position, moves it into the set position and transfers it in the correct, i.e. set, position to the downstream station, in particular to the metal-forming press.

The handling unit here has to fulfil two tasks; it has to transfer parts from the continuous conveying equipment to the metal-forming press on the one hand and to perform a positional orientation of the plate-shaped parts on the other hand. This is inefficient and results in long cycle times.

Prior art further provides for mechanical centring devices which are located on the continuous conveying equipment and move arriving plate-shaped parts into a centred position. This operation is performed in the manner of a mechanical lock, i.e. the incoming parts are moved into the correct centred position by touch. In this process, the positional orientation is not very accurate, because all incoming plate-shaped parts are centred in the same way irrespective of their actual position. It is moreover not possible to process a large number of parts in this way.

The invention is therefore based on the problem of creating a device of the type referred to above and a method for the positional orientation of plate-shaped parts, by means of which the plate-shaped parts can be positioned precisely and correctly in a simple way and by means of which moreover the number of plate-shaped parts which can be transferred to a downstream station in any cycle can be increased.

This problem is solved by a device for the positional orientation of plate-shaped parts with the features of the device claims and by a method for the positional orientation of plate-shaped parts with the features of the method claims.

The invention provides for a device for the positional orientation of plate-shaped parts, in particular sheet metal blanks, comprising continuous conveying equipment for conveying plate-shaped parts, an optical measuring device assigned to the continuous conveying equipment for determining the actual position of at least one specific plate-shaped part and for comparing this actual position to a stored set position and for determining the deviation of the actual position from the set position, and a control unit coupled to the optical measuring device for controlling a positioning unit such that at least one specific plate-shaped part the deviation of which from the set position was determined can be picked up by the positioning unit in a pick-up region and deposited in a defined delivery region in the correct position corresponding to the set position for transfer on the continuous conveying equipment.

By means of the positioning device, the plate-shaped parts can therefore be brought into their set position and transferred to a downstream station and can in particular be placed in a metal-forming press in the correct position by means of a downstream handling unit. The positioning device is therefore used exclusively for positioning or orienting plate-shaped parts in the set position. Compared to the prior art referred to above, where the handling unit has two functions, i.e. parts transfer and positional orientation, the present invention separates these functions. Control and the sequence of motions are therefore simplified, allowing the number of plate-shaped parts per cycle or their throughput to be increased.

In a particularly preferred manner, the positioning unit comprises at least one robot. In a particularly preferred variant, the at least one robot is designed as a multiaxial articulated robot.

In a further development of the invention, the measuring device comprises a camera system for taking pictures of the actual position of at least one specific plate-shaped part. This results in a fast detection of the actual position.

The continuous conveying equipment expediently comprises at least one conveyor belt for conveying plate-shaped parts.

The invention further relates to a method for aligning the position of plate-shaped parts with the features of the independent claim 5.

The method according to the invention for aligning the position of plate-shaped parts includes the following steps:
the supply of plate-shaped parts on continuous conveying equipment,
the determination of the actual position of at least one specific plate-shaped part on the continuous conveying equipment by means of an optical measuring device and comparison of the detected actual position to a stored set position,
the determination of the deviation of the actual position from the set position,
the picking-up of the at least one specific plate-shaped part with the detected deviation from the set position in a pick-up region by a positioning unit and the depositing of the plate-shaped part in the correct position corresponding to the set position on the continuous conveying equipment in a defined delivery region,
the transfer of the at least one plate-shaped part.

As mentioned above, the positioning unit, which is exclusively used for moving plate-shaped parts into their set position, can result in high flexibility and moreover in a high yield of plate-shaped parts.

If at least one robot is used, in particular, flexibility can be improved further. For example, at least one plate-shaped part can be deposited in an angular position which differs from its original orientation. In this process, the set position involves a change of angle. It is in particular possible to deposit a plate-shaped part in the horizontal plane while changing its original orientation by 90 degrees.

In a further development of the invention, the delivery region for the plate-shaped part corresponds to the pick-up region. It is therefore possible to deposit the at least one plate-shaped part, following its positional orientation into set position, in the region where it has previously been picked up with respect to the positioning device.

Alternatively, the delivery region may differ from the pick-up region. The at least one plate-shaped part may for example be placed upstream of the pick-up region in the transfer or conveying direction in order to take account of the movement of the continuous conveying equipment during the positional orientation process. The delivery region can obviously be moved towards the back, i.e. behind the pick-up region in the transfer direction.

In a further development of the invention, at least two plate-shaped parts placed adjacent to each other are picked up simultaneously, brought into their set positions simultaneously and deposited simultaneously.

Alternatively, at least two plate-shaped parts arranged one behind the other can be picked up simultaneously, brought into their set positions simultaneously and deposited simultaneously.

It is also possible for a plurality of plate-shaped parts arranged one behind the other or adjacent to one another to be picked up simultaneously and to be deposited simultaneously in a changed angular position.

In a further development of the invention, a single robot is provided to orient either single plate-shaped parts or a plurality thereof into their set positions.

Even higher flexibility is obtained if several robots are provided for simultaneously orienting either individual or several plate-shaped parts into their set positions.

Figure 2:
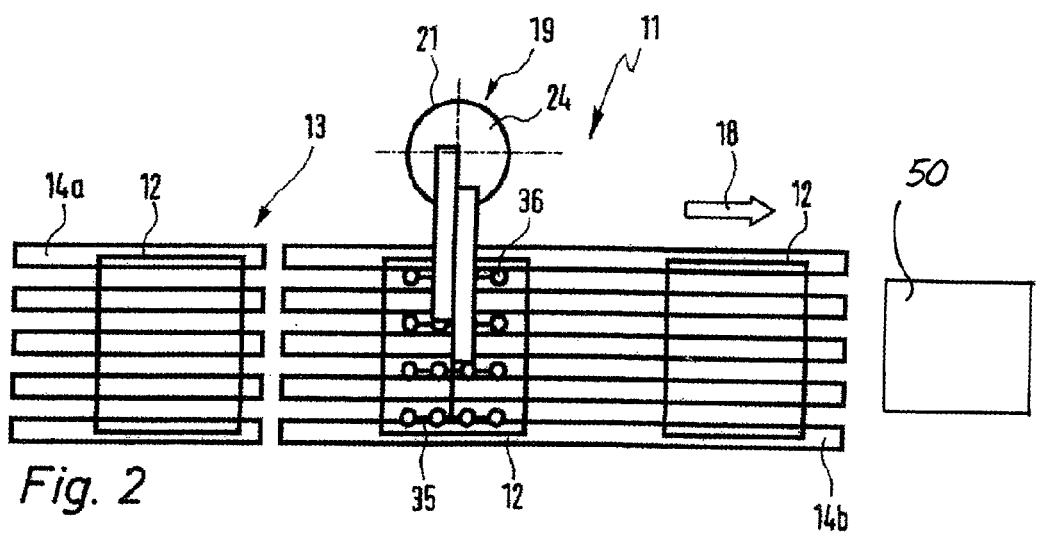
Figure 3:
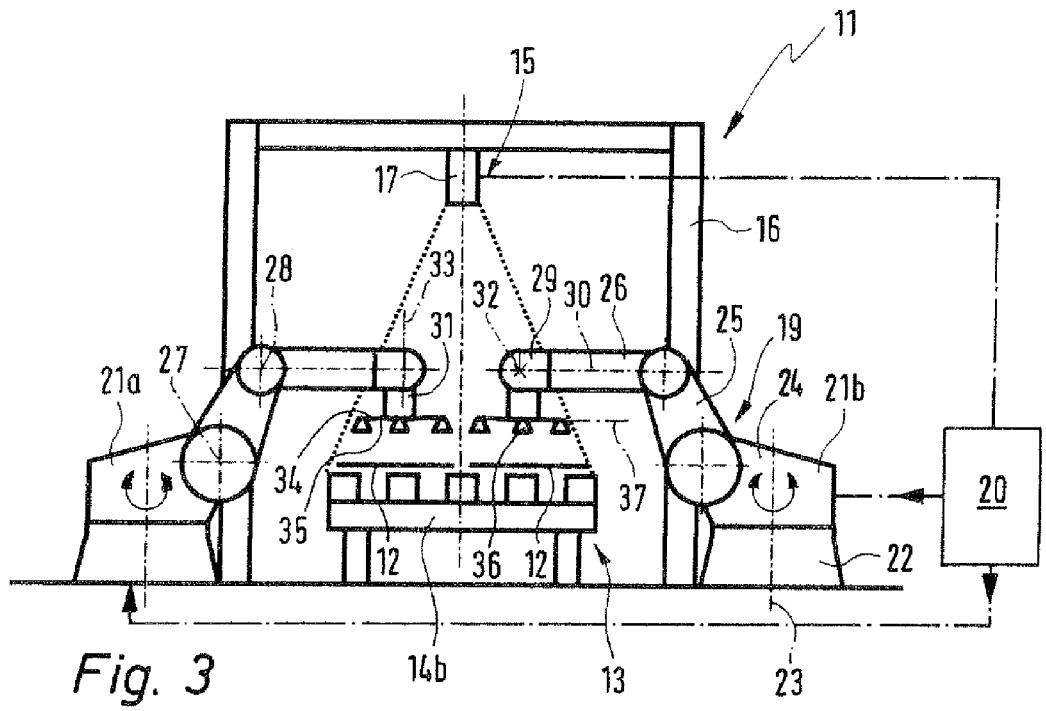
Figure 4:
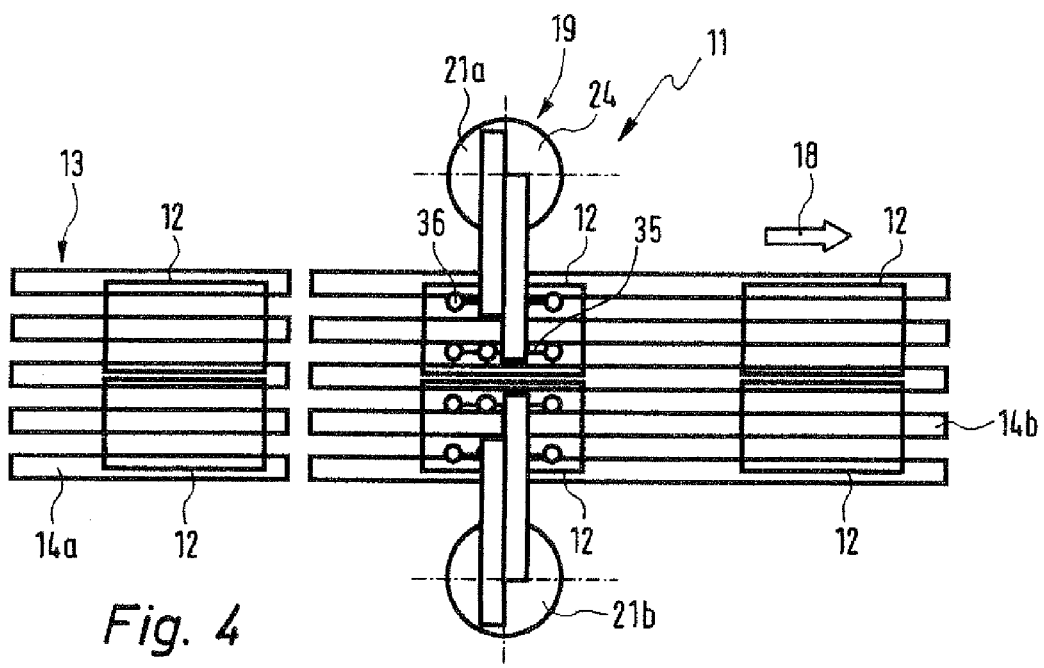
Figure 5A:
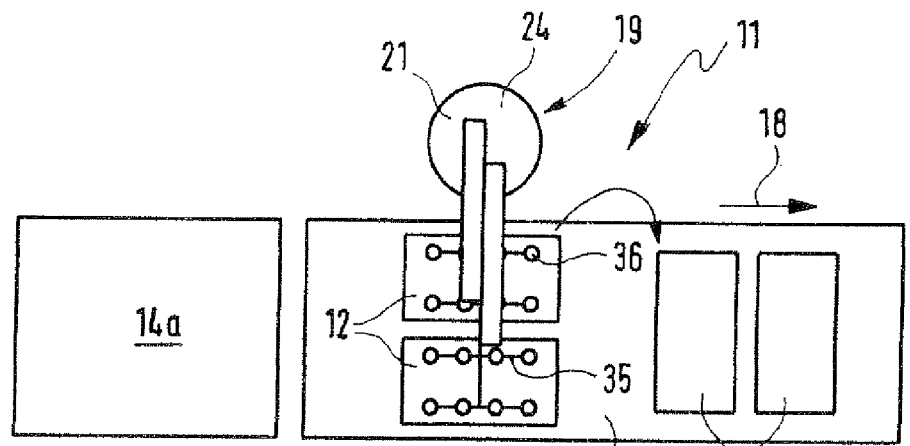
Figure 5B:
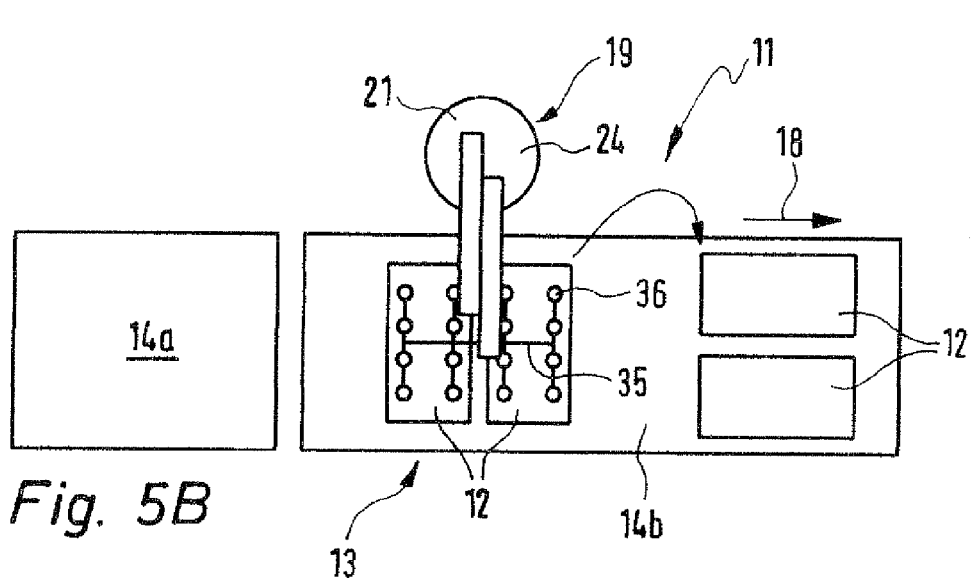
Figure 5C:
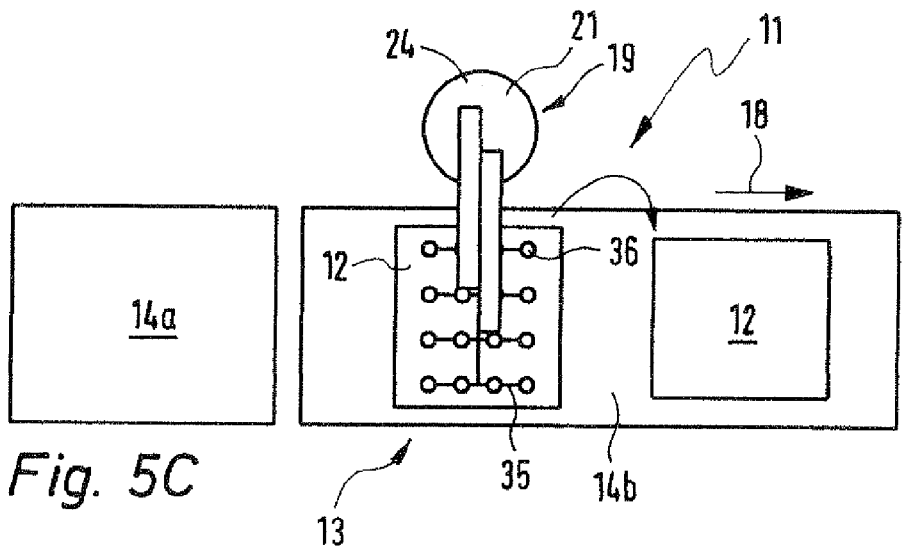

Preferred embodiments of the invention are illustrated in the drawing and explained in greater detail below. Of the drawing:

FIG. 1 is a side view of a first embodiment of the device for the positional orientation of plate-shaped parts, FIG. 2 is a top view of the device for positional orientation from FIG. 1, FIG. 3 is a side view of a second embodiment of the device for the positional orientation of plate-shaped parts, FIG. 4 is a top view of the device for positional orientation from FIG. 3, and FIG. 5 is a top view of the device for positional orientation from FIG. 1, the sub-figures 5A to 5C showing variations in the positional orientation of plate-shaped parts.

FIGS. 1 and 2 show a preferred embodiment of the device 11 according to the invention for the positional orientation of plate-shaped parts 12. In the present context, the plate-shaped 12 parts are sheet metal blanks, for example body panels which have not yet been shaped. The device for positional orientation, which will hereinafter simply be referred to as positional orientation device 11, is a part of a press line in which the plate-shaped parts 12 finally arrive at a metal forming press where they are shaped.

The positional orientation device 11 comprises continuous conveying equipment 13 for conveying plate-shaped parts 12. The continuous conveying equipment 13 includes a plurality of corresponding conveyor belts 14a, 14b on which plate-shaped parts 12 which may previously have been unstacked or separated in an unstacking device (not illustrated) are conveyed.

The positional orientation device 11 further comprises an optical measuring device 15 expediently placed above one of the conveyor belts 14a, 14b for determining the actual position of at least one specific plate-shaped part 12 and for comparing the detected actual position to a stored set position and for determining the deviation of the actual position from the set position. By way of example, the optical measuring device is mounted on a gantry-type supporting unit 16 which bridges the respective conveyor belt 14a, 14b. The optical measuring device 15 is provided with a camera system 17 focussed on the respective conveyor belt 14a, 14b to take pictures of the actual position of the at least one specific plate-shaped part 12.

Downstream of the optical measuring device 15 in a transfer direction 18 of the respective conveyor belt 14a, 14b, a positioning unit 19 controlled by a control unit 20 is provided. The control unit 20 is in turn coupled to the optical measuring device 15, whereby the data concerning the positional deviation of a specific plate-shaped part are transmitted to the positioning unit 19.

According to the first embodiment shown in FIGS. 1 and 2, the positioning unit 19 comprises a single robot 21 designed as a multiaxial articulated robot. The robot 21 is free-standing and comprises a robot base 22 on which a motion unit 24 is mounted for pivoting about a first pivoting axis 23 which is vertical in the position of use, the motion unit comprising a base-side swivelling part mounted on the robot base 22 for pivoting about the vertical first pivoting axis 23. The motion unit 24 further comprises an articulated arm consisting of an upper arm 25 and a forearm 26. One end of the upper arm 25 of the articulated arm is pivotable together with the swivelling part about a second pivoting axis 27 which is horizontal in the position of use, while the other end is connected to the adjacent end of the forearm 26 while being capable of pivoting about a horizontal third axis 28.

The motion unit 24 further comprises a rotary member 29 located at the end of the forearm 26 which is opposite the upper arm 25 and rotatable about a fourth axis 30 extending in the longitudinal direction of the forearm 26. At the end opposite the forearm 26, the rotary member 29 is provided with a swivelling member 31 joined to the rotary member 29 while being capable of pivoting about a fifth axis 32 extending at right angles to the fourth axis 30.

A rotation member (not illustrated) rotatable about a sixth axis 33 extending at right angles to the fifth axis 32 and fitted with a support part 34 is attached to the swivelling member 31, so that the support part 34 follows the rotary motion of the rotary member. The support part 34 preferably supports a lifting device 35 with vacuum suction units 36. The arrangement is designed such that the support part 34 extends towards the sixth axis 33 from the swivelling member or from the rotation member mounted thereon and that the lifting device 35 includes a retaining device holding the vacuum suction units 36, which is joined to the support part 34 while being rotatable about a seventh axis 37 oriented at right angles to the sixth axis 33. Further details on the structure and the motion sequence of an articulated robot with seven axes can be found in EP 1 623 773.

The second embodiment of the positional orientation device 11 as shown in FIGS. 3 and 4 differs from the first embodiment in that, instead of a single robot 21, two robots 21a, 21b are placed opposite each other to the left and to the right of the respective conveyor belt 14b. Such an arrangement is in particular chosen if plate-shaped parts 12 arranged side by side are to be oriented. The two robots 21a, 21b are expediently built identical and correspond to the single robot of the first embodiment described above. The two robots 21a, 21b can be controlled to operate synchronously by means of the control unit 20.

According to the first embodiment shown in FIGS. 1 and 2, plate-shaped parts 12, these being sheet metal blanks which have previously been unstacked from a stack of parts in an unstacking device, are supplied on the conveyor belts 14a, 14b. They then arrive in the region of the optical measuring device 15, where an image of the actual position of the plate-shaped part 12 is produced by means of the camera system. For this purpose, the respective conveyor belt 14a is stopped for a short time, so that a well-defined image is created. From the image of the plate-shaped part 12, its actual position is determined in the optical measuring device 15 and compared to a stored set position. From this comparison between actual and set values, any deviation of the respective plate-shaped part 12 from the set position is determined. The data related to this deviation are then transmitted to the control unit 20 which controls the robot 21.

The robot 21 picks up the respective plate-shaped part in a pick-up region and aligns it to the set position. The plate-shaped part 12 is then deposited in the set position in a defined delivery region. The delivery region may be identical to the pick-up region. Alternatively, the robot 21 may move the plate-shaped part 12 slightly forwards in the transfer direction to compensate for the forward movement of the conveyor belt 18 during the orientation process. FIG. 2 illustrates this positional orientation using relatively large-surface sheet metal blanks, but the robot may simultaneously pick up two smaller sheet metal blanks arriving one behind the other or arranged adjacent to each other and deposit them in their correct set positions.

As FIG. 5C shows, the robot 21 may pick up a plate-shaped part and orient it into its set position, the plate-shaped part being deposited in a changed angular position, in particular rotated about 90 degrees in the horizontal plane. Two plate-shaped parts picked up at the same time can obviously be re-oriented in the same way, so that two plate-shaped parts arriving one behind the other may be re-orientated to lie adjacent to each other (FIG. 5B) or two plate-shaped parts 12 arriving side by side may be re-orientated to end up as two plate-shaped parts 12 lying one behind the other (FIG. 5A).

In the second embodiment shown in FIGS. 3 and 4, two plate-shaped parts 12 placed side by side arrive in the region of the optical measuring device 15, where an image is produced of each part 12 by means of the camera system 17. Here, too, the actual position is compared to the set position, allowing the determination of any deviation from the set position. The control unit 20 then controls the two robots 21a, 21b, each of which expediently picks up one of the plate-shaped parts 12, re-orientates it and deposits it in the set position.

Both in the first and in the second embodiment, the positional orientation is followed by a transfer of the plate-shaped parts in their set position on the conveyor belt, until a handling unit (not illustrated), which is expediently likewise represented by a robot, picks up the parts in the correct positional orientation and introduces them into a downstream metal-forming press, where the plate-shaped parts are shaped.

The invention claimed is:

1. A device for the positional orientation of plate-shaped parts, the device comprising:
   continuous conveying equipment for conveying plate-shaped parts, said continuous conveying equipment comprising a first conveyor belt on which previously unstacked plate-shaped parts are conveyed and a second conveyor belt arranged downstream of the first conveyor belt in a transfer direction for conveying plate-shaped parts received from the first conveyor belt,
   an optical measuring device assigned to the first conveyor belt for determining an actual position of at least one specific plate-shaped part, for comparing the determined actual position to a stored set position, and for determining a deviation of the actual position from the set position,
   a positioning unit assigned downstream of the optical measuring device in a transfer direction to the second conveyor belt, said positioning unit comprising a plurality of robots,
   a control unit coupled to the optical measuring device for controlling the plurality of robots to pick up at least one specific plate-shaped part, the deviation of which from the set position was determined, in a pick-up region on the second conveyor belt and cause the at least one specific plate-shaped part to be deposited in a defined delivery region on the second conveyor belt in the set position for further transfer on the second conveyor belt.

2. The device according to claim 1, wherein the at least one robot are designed as multiaxial articulated robots.

3. The device according to claim 1, wherein the optical measuring device comprises a camera system for taking pictures of the actual position of at least one specific plate-shaped part.

4. The device according to claim 1, wherein the at least two plate-shaped parts are sheet metal blanks.

5. The device according to claim 1, wherein the plurality of robots are controlled by the control unit to orient simultaneously individual plate-shaped parts or a plurality of plate-shaped parts simultaneously into the set position.

6. The device according to claim 1, wherein the optical measuring device is mounted on a gantry-type supporting unit which bridges the first conveyor belt.

7. The device according to claim 1, wherein the plurality of robots comprising two robots placed opposite to each other to the left and to the right of the second conveyor belt.

8. A method for the positional orientation of plate-shaped parts comprising the following steps:
   supplying plate-shaped parts on continuous conveying equipment, said continuous conveying equipment comprising a first conveyor belt on which previously unstacked plate-shaped parts are conveyed and a second conveyor belt arranged downstream of the first conveyor belt in a transfer direction for conveying plate-shaped parts received from the first conveyor belt,
   determining the actual position of at least two specific plate-shaped parts placed adjacent to each other or one behind the other on the continuous conveying equipment by an optical measuring device and comparing the detected actual position of each plate-shaped part to a stored set position,
   determining the deviation of the actual position from the set position,
   conveying and transferring the plate-shaped parts, the deviation of which from the set position was determined, to the second conveyor belt,
   picking-up simultaneously the at least two specific plate-shaped parts with the detected deviation from the set position in a pick-up region on the second conveyor belt by a positioning unit comprising a plurality of robots, simultaneously bringing the plate-shaped parts into the set positions and simultaneously depositing the plate-shaped parts in the set position in a defined delivery region on the second conveyor belt, and
   further transferring the at least two plate-shaped parts on the second conveyor belt.

9. The method according to claim 8, wherein the at least two plate-shaped parts are deposited in an angular position differing from its original orientation.

10. The method according to claim 9, wherein the at least two plate-shaped parts are deposited after having been rotated about 90 degrees from its original orientation in the horizontal plane.

11. The method according to claim 8, wherein the delivery region for the plate-shaped parts correspond to the pick-up region.

12. The method according to claim 8, wherein the delivery region differs from the pick-up region.

13. The method according to claim 8, wherein the positioning unit comprises at least two robots.

14. The method according to claim 13, wherein the at least two robots are multiaxial articulated robots.

15. The method of claim 8, wherein the second conveyor belt is stopped for a short time, so that a well-defined image is created.

\* \* \* \* \*